United States Patent [19]

Hon

[11] Patent Number: 4,856,343
[45] Date of Patent: Aug. 15, 1989

[54] MONITORING LIQUID LEVEL INFED TANK AND FLOW RATE OF LIQUID THEREFROM TO POINT OF USE

[75] Inventor: Clarence C. Hon, Cherry Hill, N.J.

[73] Assignee: Mobil Oil Corporation, New York, N.Y.

[21] Appl. No.: 124,638

[22] Filed: Nov. 24, 1987

[51] Int. Cl.⁴ .............................................. G01F 1/00
[52] U.S. Cl. ...................................... 73/861; 73/168; 73/291
[58] Field of Search ................ 73/168, 861, 223, 3, 73/291, 198

[56] References Cited

U.S. PATENT DOCUMENTS

| | | | |
|---|---|---|---|
| 2,826,067 | 3/1958 | Braunlich | 73/168 |
| 3,000,207 | 9/1961 | Goffe | 73/223 |
| 3,019,649 | 2/1962 | Kuntz | 73/223 |
| 3,105,896 | 10/1963 | Tolin et al. | 235/151 |
| 3,271,993 | 9/1966 | Whitson | 73/168 |
| 3,308,662 | 3/1967 | Maurer | 73/231 |
| 4,165,640 | 8/1979 | Feser | 73/194 E |
| 4,170,765 | 10/1979 | Austin et al. | 367/100 |
| 4,229,798 | 10/1980 | Rosie et al. | 364/564 |
| 4,322,972 | 4/1982 | Karjala | 73/168 |
| 4,353,118 | 10/1982 | Heimgartner et al. | 364/510 |
| 4,375,667 | 3/1983 | Buchan | 364/418 |
| 4,397,189 | 8/1983 | Johnson et al. | 73/861 |
| 4,433,577 | 2/1984 | Khurgin et al. | 73/290 V |
| 4,538,445 | 9/1985 | Kenik | 73/168 |
| 4,602,344 | 7/1986 | Ferretti et al. | 364/509 |

Primary Examiner—Herbert Goldstein
Attorney, Agent, or Firm—Alexander J. McKillop; Charles J. Speciale

[57] ABSTRACT

The flow rate of liquid being fed to a point of use is continuously monitored as is the liquid level in the feed tank by detecting the level in a liquid gauge member at two successive locations while feed from the tank is blocked, so that such detected data can be employed in a computer to output the flow rate and tank level.

14 Claims, 1 Drawing Sheet

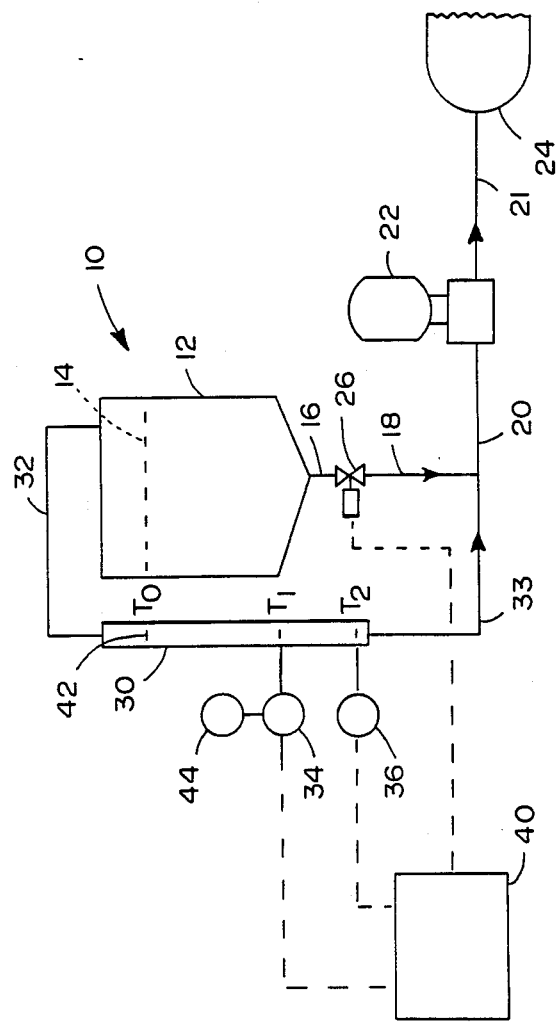

MONITORING LIQUID LEVEL INFED TANK AND FLOW RATE OF LIQUID THEREFROM TO POINT OF USE

BACKGROUND OF THE INVENTION

The present invention relates to the monitoring, i.e., regular interval checking of both the level in a feed tank from which liquid is being withdrawn for delivery to a point of use, and the flow rate at which that delivery is taking place. It is particularly applicable to monitoring the feed of a liquid additive to a chemical reactor vessel.

In certain industrial operations and processes, it is important to be able to regularly and conveniently check liquid flow rates and levels. For example, in a polymerization process there can be a process requirement to feed a liquid additive such as a liquid or suspended slurry catalyst at a constant rate to the reactor vessel, the additive stock usually being confined in a feed tank and withdrawn therefrom for delivery to the reactor. This constant feed rate must be maintained at quite precise value since departure from the intended feed rate can materially alter the polymerization process with regard to the make up of the polymer produced as well as the yield achieved. Frequent monitoring of the feed tank level as well as the flow rate parameter of the additive feed facilitates and insures proper control of the overall polymerization process since the monitoring allows for any needed compensation in the catalyst supply to the reactor.

SUMMARY OF THE INVENTION

An object of the present invention is to provide an improved method and apparatus by which the liquid level in a feed tank and the flow rate at which such liquid is being fed to a use point can be checked.

Another object is to provide a liquid level and flow rate checking method and apparatus which are (a) constituted of and use simplified readily available components, (b) reliable, (c) highly accurate, (d) suited for quick and repeated checking purposes at regular intervals and (e) require no special handling of the liquid incident the checking operation other than the normal delivery thereof to the use point.

Other objects of the invention will be made apparent from the description of the invention given hereinafter.

In accordance with the invention, a feed tank containing liquid which can be withdrawn from the tank through a tank bottom outlet by a pump for delivery to a point of use, such as a polymerization reactor, is provided with a normally open, power operated closure valve intervening the tank bottom outlet and the pump. Further, the tank is fitted with a liquid gauge member such as an upright tube of constant cross-section, with the tube being in communication with the interior of the feed tank such that a column of liquid is present in the gauge member to the same level as liquid is present in the feed tank. A pair of level detection sensors are fitted at spaced vertical locations on the gauge member, e.g., one being located proximate the bottom of the feed tank and since the gauge member preferably extends some distances down from the tank, the other being at some distance below the tank. These level detection sensors operate to detect a liquid level in the gauge member at the sensor locations and output such detections as electrical signals which are fed as input into a computer.

When it is desired to effect a monitoring task, the computer is employed to initiate at time $T_0$ a control command to the closure valve to power actuate it to a closed position from its normally open position. The pump thus no longer can withdraw liquid from the tank but since the bottom of the gauge member has direct connection to the pump inlet, the pump will continue to deliver liquid to the use point by withdrawing liquid from the column thereof which is present in the gauge member. With the liquid column in the gauge member being reduced, the level thereof will, as it is reducing, be detected at the locations of the two level detection means. These detections are converted to electrical signals indicative of successive times $T_1$ and $T_2$. The computer which has been programmed with the geometry characteristics of the gauge member, i.e., the cross-sectional area, processes these electrical signals as an output indicating the pump delivery flow rate to the point of use. That output can be used to operate a visual recorder which can provide the tester with a visual digital display of the flow rate value, e.g., in terms of cc/min.

After the computer derives the flow rate value from the $T_1$ and $T_2$ time signals, the flow rate value can be processed in conjunction with the time $T_0$ and $T_1$ data stored in the computer to output a signal denoting the height that the level of the liquid column in the gauge member was at at time $T_0$ and thus indicating the level of the liquid in the feed tank.

The computer also operates at time $T_2$ to initiate a command to shift the closure valve from closed to open position thereby reestablishing withdrawal suction to the pump from the feed tank and the reestablishment of the liquid column in the liquid gauge to that of the liquid level in the feed tank.

The invention provides that flow rate and liquid level monitoring can be carried out in a most convenient and simplified fashion. All that need be done is for an operator to initiate the checking cycle with a command (at time $T_0$) through the operator's console. The checking procedure will automatically ensue and can be programmed to last a certain time. For example, the apparatus can be programmed to carry out the checking of the flow rate and tank liquid level over a period of about one minute and the checking interval can be set to be five minutes so that twelve checks are made each hour. This regular and highly accurate checking procedure is particularly suited for monitoring catalyst feed in a polymerization process wherein high precision in the control of the catalyst feed is necessary. In a catalyst feed operation, the feed rate of catalyst to the reactor can be relatively low, e.g., being only a few cc/min. Most known devices for measuring flow rate are incapable of providing accurate flow rate measurements at a rate of 1 cc/min or below—the method and apparatus of the invention are completely accurate and effective for checking at such flow rate values.

Of added importance is that the present invention operates on a non-contact detection basis so that the properties of the liquid involved are irrelevant to the checking. This is significant in regard to the applicability of the invention to use with fluids of hazardous nature or which are too thin for conventional instrumentation handling thereof, or where the liquids are types which contain solids that could disable conventional flow meters.

No interruption of normal system operation attends the monitoring of flow rate and level parameters with the present invention and there is no change in the operating condition in the feed tank which is a closed vessel. This is an important consideration when the liquid is one with high vapor pressure which could result in liquid evaporation if the flow rate check was carried out in an open vessel such as an open burette.

The invention accordingly comprises the features of construction, arrangement of parts and steps as are embodied in the apparatus and method for checking flow rate and liquid feed level as will be exemplified in the description hereinafter set forth and the scope of the invention will be indicated in the claims.

BRIEF DESCRIPTION OF THE DRAWING

A fuller understanding of the nature and objects of the invention will be had from the following detailed description taken in conjunction with the accompanying drawing which is a diagrammatic depiction of apparatus for monitoring liquid level in a feed tank and the flow rate of liquid therefrom to a point of use. Like reference numerals are used in the description to denote like parts in the drawing.

DESCRIPTION OF THE PREFERRED EMBODIMENTS

Referring to the drawing, the apparatus 10 includes a closed feed tank 12 containing liquid therein, the level of the liquid being denoted at 14. Tank 12 has a bottom outlet 16 and is connected by piping 18, 20 to the inlet of pump 22, the pump, e.g., being a reciprocating or centrifugal pump operating at constant speed to deliver liquid from tank 12 to a point of use, such as reactor vessel 24. When a pump 22 is used to withdraw liquid from tank 12, tank 12 need not be pressurized. Alternatively, another form of flow control means, such as a control valve, may be used instead of pump 22 to withdraw liquid from tank 12 if tank 12 is pressurized. A closure valve 26 intervenes the tank outlet 16 and the inlet to the pump, the valve by way of example being a normally open solenoid operated valve member. To move the valve to a closed condition, the solenoid will be energized.

The tank 12 is fitted with a liquid gauge member 30 which is an upright tubular component, e.g., a sight glass, and it has a constant cross-section from top to bottom. The top of member 30 communicates by line 32 with the overhead space in tank 12 and the bottom of the tube 30 extends a distance below the tank outlet, the tube bottom being connected directly to the inlet to pump 22 by piping 33. Tube 30, which can, for example, have an inside diameter of ¼ inch, extends from adjacent the top of the tank to a location wherein the bottom thereof is six or more inches below the tank outlet.

A pair of non-contact level switches 34, 36 constituting level detection means are located on the tube 30 at the respective two points shown so that one is located at about the bottom of tank 12 and the other is spaced some distance (e.g., about 6 inches) below the one.

Connection of the control unit, i.e. computer 40, with the level switches 34, 36 and solenoid valve 26 is shown in dashed lines.

When a check is to be made of the rate at which liquid is being delivered to the reactor vessel 24, the operator will initiate at the console of computer 40 and at time $T_0$, a command signal. At that time $T_0$, the level 42 in the gauge member 30 will be the same as that at 14 in tank 12. The command signal will be direction for the solenoid valve 26 to become energized and thus its closure member will be moved to a closed position. As a result the only suction to pump 22 will be the liquid in the liquid column present in gauge member 30 and the level of that column will reduce. When the reducing liquid column in gauge member 30 is detected by level switch 34, that detection will be recorded as time $T_1$ and converted to an electrical signal as an input to the computer 40. When the reducing level is thereafter detected by level switch 36, such event will be recorded as time $T_2$ and suitable electrical signal will be inputed to the computer.

The computer 40 will have, as programmed data therein, the geometry of the gauge member, and with that data the computer will process the electrical signals $T_1$, $T_2$ to provide an output which indicates the rate of the delivery of liquid flow to the reactor vessel. This output can be used, e.g., to control a visual recorder showing the flow rate in numerical value. The processing of the detected level values at $T_1$, $T_2$ is calculated to provide $$\text{Flow rate} = \frac{\frac{\pi D^2}{4}}{(T_2 - T_1)} \cdot L,$$

the inside diameter of the gauge member being D, and L the distance between the two switches 34, 36.

The computer 40 also will provide an output of the level which the column in member 30 is at at time $T_0$ (which level is the same level as in tank 12). The computer will process this output on the basis of $$\text{Level at } T_o = \frac{\text{Flow Rate} \cdot (T_1 - T_o)}{\frac{\pi D^2}{4}}$$

At time $T_2$ the computer will also function to initiate a command to deenergize the solenoid of valve member 26 and thus open the valve to reestablish feed suction to the pump from the tank as such. The whole checking procedure takes only about one minute. Monitoring checks can be carried out at regular five minute intervals to thereby insure that the feed rate of, e.g., catalyst to the reactor is optimized by effecting any needed control where feed rate deviation from that intended is noted.

A further feature is that a low level alarm 44 can be arranged in circuit with level switch 34 to serve as a safety device in the event the tank contents be reduced to near empty condition. Alarm 44 will be arranged to be non-activating whenever the valve 26 is closed, i.e., when the level in gauge member is deliberately reduced for monitoring purposes.

As mentioned previously, pump 22 may be of the reciprocating or centrifugal type which produces, in effect, a series of liquid pulses or spurts in conduit 20. For this reason, measurement of the flow rate by using a conventional flow rate meter connected in series with piping 20, or with piping 21 following the pump, would be impossible because of the flow characteristics of the liquid resulting from the reciprocating action of the pump. A pulsation dampener would have to be employed in series with the flow meter to make such measurements. However, such pulsation dampeners are fairly expensive. With the present invention, however, the flow rate of the apparatus may be measured even when the apparatus employs a reciprocating or centrifugal pump. This is because the level in gauge member 30 decreases over a period of time, and the present invention measures the average change in level over time between $T_0$ and $T_1$ and $T_0$ and $T_2$.

While there is above disclosed only certain embodiments of the present invention it will be apparent that variations can be made therein by the those skilled in the art without departing from the scope of the inventive concept disclosed.

What is claimed is:

1. In a liquid feed system wherein liquid is withdrawn through an outlet at the bottom of a feed tank with a pump having an inlet which delivers the liquid to a use point and a constant cross-section liquid gauge member communicates with the interior of the tank such that a column of liquid is present in said gauge member to the same level as that in the tank, the gauge member further being in communication with the inlet of said pump, a method for checking the rate at which the pump is delivering liquid to the point of use, said method comprising blocking the tank outlet at time $T_0$ so that the pump withdraws liquid only from the gauge member thereby reducing the level in the gauge member, detecting the level of liquid in the gauge member at first and second reduced levels thereof and converting these detections to electrical signals indicative of times $T_1$, and $T_2$, processing the time $T_1$ and $T_2$ electrical signals in a computer to provide the flow rate in said gauge member as a processed signal output indicative of the pump delivery flow rate to the point of use, and further processing the flow rate, the $T_1$ electrical signal and data representative of time $T_0$ to compute the height of the level of the liquid column in the gauge member at time $T_0$.

2. The method of claim 1, wherein the pump is one of a reciprocating and centrifugal pump.

3. The method of claim 1 in which the computer is operated to generate a command signal for controlling the blocking of the tank outlet at time $T_0$.

4. The method of claim 3 in which the computer is operated to generate another command signal at time $T_2$ for controlling the unblocking of the tank outlet.

5. In a liquid feed system which includes a feed tank for holding a liquid and having a bottom outlet, a pump having an inlet operating to withdraw liquid from the tank through said outlet and deliver it to a point of use, and a constant cross-section liquid gauge member communicating with the interior of said tank such that a column of liquid is present in said gauge member to the same level as that in the tank, the gauge member further being in communication with the inlet of said pump, apparatus for checking the rate at which the pump is delivering liquid to the point of use, said apparatus comprising a normally open power operated closure valve intervening the tank outlet and the pump, means for power actuating said closure valve at time $T_0$ to move it to a closed position so that the pump withdraws liquid only from the gauge member thereby reducing the level of liquid in said gauge member, first and second level detection means on said liquid gauge member positioned thereon at respective first and second vertically spaced locations and operable to detect level presence at such locations as times $T_1$ and $T_2$ values and output such detections as electrical signals, and means for processing the time $T_1$ and $T_2$ electrical signals to provide the flow rate in said gauge member as a processed signal output indicative of the pump delivery flow rate to the point of use, said means for processing the electrical signals comprising a computer acquiring said signals, the computer being operable to generate a command signal at time $T_0$ to control the power actuation of the closure valve to closed position thereof, the computer being further operable to process the flow rate, the $T_1$ electrical signal and data representative of time $T_0$ to compute the height of the level of the liquid column in the gauge member at time $T_0$.

6. The apparatus of claim 5, wherein the pump is one of a reciprocating and centrifugal pump.

7. The apparatus of claim 5 in which the computer is operable to generate a command signal at time $T_2$ to control return of the closure valve to an open position.

8. The apparatus of claim 5 in which the liquid gauge member is an upright tube extending from adjacent the top of said feed tank to a point a distance below the bottom of said tank.

9. The apparatus of claim 8 in which the first level detection means is located on the gauge member proximate the bottom of said feed tank, the second level detection means being located on the gauge member below the tank bottom.

10. The apparatus of claim 9 further comprising a tank low level alarm means operatively coupled with said first level detection means, the computer being operable to inactivate said alarm means at times when said valve is in clsoed position.

11. The apparatus of claim 8 in which the liquid gauge member is a transparent sight glass.

12. The apparatus of claim 5 in which the closure valve is a solenoid control valve, energization of the solenoid moving the valve to closed position.

13. The apparatus of claim 5 in which the first and second level detection means each comprise non-contact level switches.

14. In a liquid feed system which includes a feed tank for holding a liquid and having a bottom outlet, a pump having an inlet operating to withdraw liquid from the tank through said outlet and deliver it to a point of use, and a constant cross-section liquid gauge member communicating with the interior of said tank such that a column of liquid is present in said gauge member to the same level as that in the tank, the gauge member further being in communication with the inlet of said pump, apparatus for checking the rate at which the pump is delivering liquid to the point of use, said apparatus comprising a normally open power operated closure valve intervening the tank outlet and the pump, means for power actuating said closure valve at time $T_0$ to move it to a closed position so that the pump withdraws liquid only from the gauge member thereby reducing the level of liquid in said gauge member, first and second level detection means on said liquid gauge member positioned thereon at respective first and second vertically spaced locations and operable to detect level presence at such locations as times $T_1$ and $T_2$ values and output such detections as electrical signals, the liquid gauge member being an upright tube extending to a point a distance below the bottom of said tank, the first level detection means being located on the gauge member proximate the bottom of said feed tank, the second level detection means being located on the gauge member below the tank bottom, and
means for processing the electrical signals to provide the flow rate in said gauge member as a processed signal output indicative of the pump delivery flow rate to the point of use.

* * * * *